United States Patent [19]

Goebel et al.

[11] 4,410,608
[45] Oct. 18, 1983

[54] ELECTROCHEMICAL CELL

[75] Inventors: Franz Goebel, Sudbury; Kathleen M. Kealey, Newburyport, both of Mass.

[73] Assignee: GTE Products Corporation, Stamford, Conn.

[21] Appl. No.: 333,160

[22] Filed: Dec. 21, 1981

[51] Int. Cl.³ .............................................. H01M 2/26
[52] U.S. Cl. ................................. 429/101; 429/161; 429/178
[58] Field of Search ............... 429/101, 105, 196, 181, 429/178, 211, 94, 161

[56] References Cited

U.S. PATENT DOCUMENTS

| | | | |
|---|---|---|---|
| 2,575,076 | 11/1951 | Smyth | 429/178 |
| 3,874,929 | 4/1975 | Greatbatch | 429/101 |
| 4,032,695 | 6/1977 | Coibion | 429/178 |
| 4,060,668 | 11/1977 | Goebel | 429/194 |
| 4,168,351 | 9/1979 | Taylor | 429/181 |
| 4,219,443 | 8/1980 | Klinedinst et al. | 429/196 |
| 4,263,378 | 4/1981 | Feiman et al. | 429/196 |
| 4,292,346 | 8/1981 | Athearn | 429/101 |
| 4,307,162 | 12/1981 | Athearn | 429/101 |

*Primary Examiner*—Donald L. Walton
*Attorney, Agent, or Firm*—Peter Xiarhos; David M. Keay

[57] ABSTRACT

A primary electrochemical cell of a design for reducing or minimizing parasitic self-discharge of the cell during storage and subsequent discharge of the cell. The cell includes a tubular porous carbon cathode structure disposed within a metal housing of the cell and spaced from an anode structure by an insulative separator material. The carbon cathode structure and the anode structure are exposed to an electrolytic solution including a reducible soluble cathode (e.g., thionyl chloride) which is catalytically reduced during discharge of the cell at the surface of the carbon cathode structure.

The anode structure includes an elongated, cylindrical lithium electrode located centrally within, and spaced from, the housing, and a thin, bare, flexible metal element at the potential of the lithium electrode and coupled between the lithium electrode and a feedthrough member provided in a top cover of the housing. The surface areas of the flexible metal element and the lithium electrode are established such that the surface area of the wire is about 1–10 percent of the initial (pre-discharge) surface area of the lithium electrode for minimizing the parasitic catalytic reduction of the soluble cathode at the surface of the flexible metal element. The flexible metal element and feedthrough member may also be covered with an anti-parasitic discharge material for preventing catalytic reduction of the soluble cathode at the surfaces of the flexible metal element and feedthrough member covered with the anti-parasitic discharge material.

22 Claims, 2 Drawing Figures

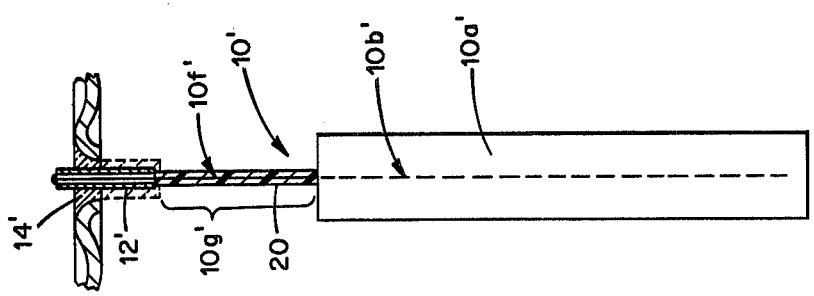
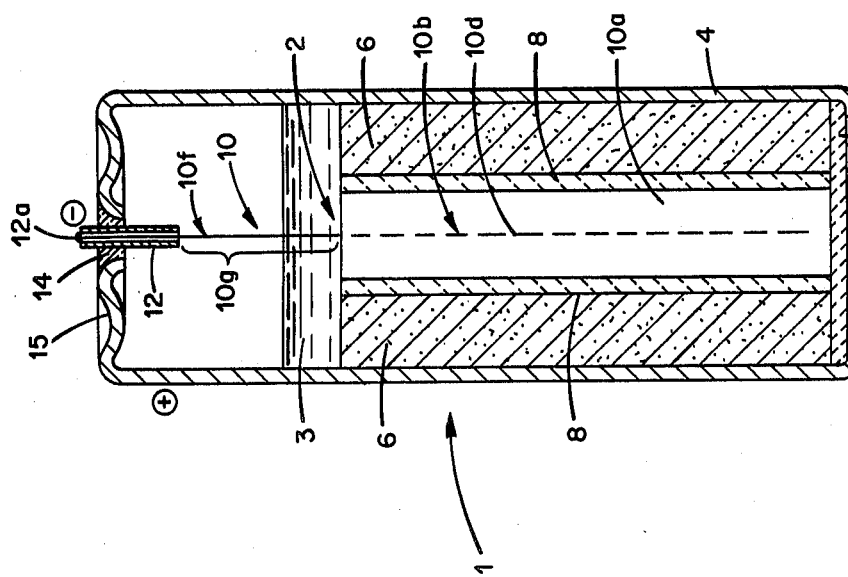
Fig. 2.
Fig. 1.

ELECTROCHEMICAL CELL

CROSS REFERENCE TO RELATED APPLICATIONS

In co-pending application Ser. No. 333,093, filed concurrently herewith in the names of Franz Goebel and Kathleen M. Kealey, and entitled ELECTROCHEMICAL CELL, and in co-pending application Ser. No. 333,094, filed concurrently herewith in the name of Franz Goebel, and entitled ELECTROCHEMICAL CELL, there are disclosed and claimed electrochemical cells similar to an electrochemical cell as disclosed and claimed in the present application.

FIELD OF THE INVENTION

The present invention relates to an electrochemical cell and, more particularly, to a primary electrochemical cell of a design for reducing parasitic, self-discharge of the cell during storage and subsequent discharge of the cell.

BACKGROUND OF THE INVENTION

Primary electrochemical cells are utilized for a wide variety of applications and are commonly available in a large assortment of sizes and shapes. One well known form of an electrochemical cell is a cylindrical cell. Such a cell is disclosed in U.S. Pat. No. 4,060,668 in the name of Franz Goebel and assigned to GTE Laboratories Incorporated. The cylindrical cell as disclosed in the above-mentioned patent includes a lithium anode, a carbon current collector cathode structure, and a separator interposed between the lithium anode and the carbon current collector cathode structure. The lithium anode takes the form of a cylindrical sheet physically pressed against an interior wall of a metal housing of the cell, and is arranged concentrically within the housing with the carbon current collector cathode structure and the separator. The assembly of the lithium anode, carbon current collector cathode structure and separator as described hereinabove is exposed to an electrolytic solution including a reducible soluble cathode and an electrolyte solute dissolved in the reducible soluble cathode. Suitable materials for the reducible soluble cathode and the electrolyte solute are thionyl chloride and lithium tetrachloroaluminate, respectively.

In the normal discharge of a cell such as described hereinabove, the reducible soluble cathode, such as the thionyl chloride, is catalytically reduced at the surface of the carbon current collector cathode structure. This catalytic reduction results, inter alia, in the formation of a variety of reaction products within the cell and a physical and volumetric depletion of the thionyl chloride and lithium. The life span of the cell is to a large degree dictated by the amount of lithium and thionyl chloride initially present in the cell and the rate at which the thionyl chloride and lithium are depleted by electrochemical action within the cell.

As the above-mentioned catalytic reduction of the thionyl chloride takes place at the surface of the carbon current collector cathode structure, a further, and undesirable, reduction of the thionyl chloride also takes place at those metallic portions and surfaces of the cell in physical contact with the lithium anode, that is, at the potential of the lithium anode, but not covered by the lithium anode. These portions and surfaces may include, by way of example, the bottom of the metal (e.g., stainless steel) housing of the cell and metal portions of the housing above the lithium anode. This latter reduction of the thionyl chloride, which may also take place prior to normal discharge of the cell, that is, during storage of the cell, is a parasitic self-discharge reaction and can lead to an undesirable capacity loss and a premature termination of the rated life span of the cell. The rate of this self-discharge is directly proportional to the metallic area of the cell at the potential of the lithium anode, but not covered by the lithium of the anode. It is highly advantageous and desirable, therefore, that those areas of the cell at the potential of the lithium anode and at which the above-mentioned self-discharge catalytic reduction of the thionyl chloride takes place be kept to a minimum so as not to unnecessarily prematurely shorten the life span of the cell.

BRIEF SUMMERY OF THE INVENTION

In accordance with the present invention, an electrochemical cell is provided which overcomes or substantially alleviates parasitic self-discharge problems as associated with prior art cells as briefly described hereinabove.

An electrochemical cell in accordance with the present invention generally includes a metal housing, a cover for the housing having a metal electrical terminal extending therethrough, and an electrochemical system within the housing. The electrochemical system includes an electrolytic solution containing a catalytically-reducible soluble cathode, and a battery stack exposed to the electrolytic solution. The battery stack as employed within the cell generally includes a cathode structure adjacent to the metal housing and an anode structure. The cathode structure operates during discharge of the cell to catalytically reduce the soluble cathode of the electrolytic solution. The anode structure comprises a metal electrode spaced from the cathode structure and the metal housing, and a thin, bare, metal element at the potential of the metal electrode and disposed between the metal electrode and the electrical terminal in the cover. In accordance with the present invention, the metal element is constructed so as to have a surface area of from 1-10 percent of the initial surface area of the metal electrode for minimizing the parasitic catalytic reduction of the soluble cathode at the surface of the metal element.

BRIEF DESCRIPTION OF THE DRAWING

In the drawing:

FIG. 1 is an elevational view, partly in cross section, of a primary electrochemical cell employing an anode structure of a first construction in accordance with the invention; and FIG. 2 is an elevational view, partly in cross section, of an anode structure of alternative construction which may be employed in the electrochemical cell of FIG. 1 in accordance with the invention.

DETAILED DESCRIPTION OF THE INVENTION

Referring now to FIG. 1, there is shown a primary electrochemical cell 1 in accordance with the present invention. As shown in FIG. 1, the electrochemical cell 1 includes a battery stack 2 employed together with an electrolytic solution 3 within an elongated cylindrical metal casing or housing 4 of the cell 1. The battery stack 2 and the electrolytic solution 3 collectively represent the electrochemical system of the cell. The battery stack 2 employed within the cell 1 is insulated from the housing of the cell by a suitable porous insulator 5 (e.g., of fiberglass) and generally includes a concentric arrangement of a porous carbon cathode structure 6, a thin porous separator 8, and an anode structure 10. As will be discussed in detail hereinafter, the anode structure 10 is constructed in accordance with the invention so as to minimize or substantially reduce parasitic self-discharge of the cell 1 during both storage and subsequent normal discharge of the cell.

The aforementioned porous carbon cathode structure 6 is a generally cylindrical, elongated tubular member comprising an aggregation of discrete, semi-rigid, porous carbon conglomerates. These conglomerates generally contain a combination of carbon black, graphite, and a binder such as "Teflon". The carbon cathode structure 6 may be a single-piece component as shown in FIG. 1 or, alternatively, the carbon cathode structure 6 may be constructed of a pre-selected number of individual annular or "donut" shaped discs superimposed upon each other in a vertical stacked array to effectively form a single carbon cathode structure of essentially any desired overall length. Suitable dimensions for the carbon cathode structure 6 for an AA-size cell are a length of 1.5 inches, an outside diameter of 0.5 inch, and an inside diameter of 0.25 inch. Because of the porous nature of the constituent components of the conglomerates used to form the carbon cathode structure 6, the carbon cathode structure 6 has a resultant network of electrolyte-conducting channels formed therein whereby the carbon cathode structure 6 can be readily permeated by the electrolytic solution 3. Techniques for producing the conglomerates employed by the carbon cathode structure 6 are described in U.S. Pat. No. 4,161,063 to which reference may be made for specific details.

The aforementioned porous separator 8 is disposed intermediate to the carbon cathode structure 6 and the anode structure 10 and is used to electrically isolate the carbon cathode structure 6 from the anode structure 10. The separator 8 typically takes the form of a cylindrical sheet of a standard electrically-nonconductive material such as fiberglass.

The anode structure 10 as utilized within the cell 1 is located centrally within the cell 1 and, as shown in FIG. 1, generally includes a solid, elongated, cylindrical metal electrode 10a, and an elongated, thin, continuous, electrically-conductive metal wire 10b. A major portion 10d of the length of the wire 10b is completely embedded within the electrode 10a and the rest of the wire 10b, indicated at 10f in FIG. 1, extends outwardly from the electrode 10a and passes upwardly through a standard, cylindrical, hollow, metal (e.g., nickel) feedthrough member 12 to which is it physically and electrically attached, specifically, to the open top end of the feedthrough member 12. The feedthrough member 12 itself passes through a standard insulative glass or ceramic-to-metal seal 14 provided within an hermetically sealed metal cap or cover 15 of the cell 1. By virtue of the hollow nature of the feedthrough member 12, the feedthrough member 12 is conveniently utilized to introduce the electrolytic solution 3 into the cell 1 for permeating the porous components of the battery stack 2, following which operation the top, open end of the feedthrough member 12 can be closed by a bead 12a formed, for example, by a simple welding operation. This latter operation also serves physically and electrically to secure the wire 10b to the feedthrough member 12 and establishes the feedthrough member 12 as the negative terminal of the cell 1. The housing 4 of the cell 1, which may be of stainless steel and against which the aforedescribed carbon cathode structure 6 physically abuts, serves as the positive terminal of the cell 1.

The aforementioned electrode 10a of the anode structure 10 is typically of an oxidizable active alkali metal such as lithium. Suitable dimensions for the electrode 10a are a length of 1.5 inches and a diameter of 0.25 inch. The wire 10b and, more specifically, a portion 10g of the wire 10b intermediate to the electrode 10a and the feedthrough member 12, is selected to have a length as small as possible and as small a cross-sectional dimension as possible (either circular or rectangular cross section), so as to provide as small a surface area as possible, for minimizing the extent of parasitic self-discharge activity at the surface area of the portion 10g of the wire 10b, as will be discussed more fully hereinafter. A suitable ratio of exposed surface area of the portion 10g of the wire 10b to the total surface area (circumferential, top and bottom) of the lithium electrode 10a is about 1–10 percent. The small cross section dimension of the wire 10b as discussed hereinabove also enables the wire 10b, especially the portion 10f thereof which extends out from the lithium electrode 10a, to be flexible and absorb any shock or vibration to which the cell 1 might be exposed, thereby to prevent a break in the physical and electrical connection between the lithium electrode 10a and the feedthrough member 12, and also to minimize the possibility of physical damage (e.g., breakage) to the glass or ceramic-to-metal seal 14 due to such factors as shock and vibration. A suitable material for the wire 10b is nickel and a suitable length therefor is approximately 1.8 inches.

A suitable and preferred electrolytic solution 3 which may be used with the above-described cell 1 is a cathodelectrolyte solution including a reducible soluble cathode, such as thionyl chloride, and an electrolyte solute, such as lithium tetrachloroaluminate, dissolved in the thionyl chloride.

In the operation of the cell 1 as described hereinabove, specifically, during normal discharge of the cell 1, the reducible soluble cathode, namely, the thionyl chloride, is principally catalytically reduced at the surface of the carbon cathode structure 6 as defined by the porous carbon conglomerates and, to a much lesser degree, at the exposed surface of the portion 10g of the wire 10b. If the electrolytic solution under any circumstance becomes in contact with the feedthrough member 12, for example, as a result of a non-vertical orientation for the cell 1, a small amount of catalytic reduction can also occur at the surface of the member 12. The above catalytic reduction results, inter alia, in the formation of a variety of reaction products within the cell and, as determined by the rate of this catalytic reduction, a gradual depletion of the metal, e.g., lithium, of the electrode 10a and the thionyl chloride. The complete depletion or consumption of either one or both of these consumable components determines the end of the useful life of the cell. Thus, it is highly desirable to extend the period of time over which the depletion of the lithium and thionyl chloride takes place so that capacity losses are minimized and a long life for the cell is reasonably guaranteed. Consistent with this objective, it is important and desirable to minimize parasitic self-discharge of the cell 1 occurring at surfaces or areas other than the surface of the carbon cathode structure 6.

In accordance with the present invention, the extent of parasitic self-discharge of the cell 1 is minimized for substantially reduced by: (1) centrally locating and positioning the lithium electrode 10a of the anode structure 10 relative to the other components of the cell 1 such that as little of the lithium electrode 10a as possible is in physical contact with metal parts or portions of the cell (such as the housing 4) at which the parasitic self-discharge might take place; and (2) establishing a very small surface area for the portion 10g of the wire 10b (intermediate to the electrode 10a and the feedthrough member 12) relative to the total surface area (circumferential, top and bottom) of the lithium electrode 10a, thereby to minimize the extent of the parasitic self-discharge activity at the exposed surface of the portion 10g of the wire 10b. The above-mentioned total surface area of the lithium electrode 10a relates to the initial surface area of the electrode 10a, that is, of surface area of the electrode 10a prior to depletion of the lithium of the electrode by electrochemical action within the cell.

The extent of parasitic self-discharge activity within the cell 1 as described hereinabove can further be reduced and minimized by employing within the cell 1 an anode structure of a form as shown at 10' in FIG. 2. The anode structure 10' as shown in FIG. 2 is similar to the anode structure 10 as shown in FIG. 1 and includes a solid, elongated cylindrical lithium electrode 10a'; an elongated, thin, continuous, metal (e.g., nickel) wire 10b' embedded within the electrode 10a' and having a flexible portion 10f extending out from the electrode 10a, and passing through and secured (as by welding) to a hollow metal (e.g., nickel) feedthrough member 12'; and an anti-parasitic discharge material 20 disposed on and covering the exposed surface of the portion 10g' of the wire 10b'. The feedthrough member 12' itself passes through a ceramic or glass-to-metal seal 14'. Thus, with the exception of the anti-parasitic discharge material 20, the anode structure 10' of FIG. 2 is the same as the anode structure 10 shown in FIG. 1.

The anti-parasitic discharge material 20 is selected to be of a sufficiently stable, catalytically-inert material which does not react chemically in an adverse or harmful fashion with the electrolytic solution 3 or reaction products produced during discharge of the cell 1. The material 20 serves to cover the exposed surface area of the portion 10g' of the wire 10b' at which undesirable parasitic self-discharge of the cell 1 might otherwise take place. Suitable substances which have the desirable chemical characteristics and which may be used for the anti-parasitic discharge material 20 include lithium, and plastics such as ethylene chlorotrifluoroethylene, or ECFE ("Halar"), and a copolymer of ethylene and polytetrafluoroethylene ("Tefzel"). The substance used for the anti-parasitic discharge material 20 should be of a sufficiently small thickness, for example, 0.003 inch, so as not to impair or destroy the flexible character of the portion 10f' of the wire 10b'. If the anode structure 10' as shown in FIG. 2 is to be used in a cell which is stored and/or subsequently used in a vertical, upright position, or the level of the electrolytic solution in the cell is below the feedthrough member 12', either initially or as a result of depletion of the thionyl chloride during discharge of the cell, it is generally not necessary to cover the feedthrough member 12' with anti-parasitic material. However, since the vertical orientation of the cell cannot normally be guaranteed, it may be desirable to cover the feedthrough member 12' with anti-parasitic material, as indicated in dotted outline in FIG. 2, to further reduce the amount of surface area metal at which parasitic self-discharge activity can take place. Alternatively, and although not shown in FIG. 2, the ceramic or glass-to-metal seal 14' could be lengthened to cover a greater portion of the feedthrough member 12' than is shown in FIG. 2.

While there have been described what are considered to be preferred embodiments of the invention, it will be apparent to those skilled in the art that various changes and modifications may be made therein without departing from the invention as called for in the appended claims.

What is claimed is:

1. An electrochemical cell, comprising:
   a metal housing and a cover for said housing, said cover having a metal electrical terminal extending therethrough; and
   an electrochemical system within the metal housing and including an electrolytic solution and a battery stack exposed to the electrolytic solution, said electrolytic solution including a catalytically-reducible soluble cathode, and said battery stack comprising:
   a cathode structure adjacent to the metal housing and operative during discharge of the cell to catalytically reduce the soluble cathode of the electrolytic solution; and
   an anode structure comprising:
      a metal electrode spaced from the cathode structure and the metal housing and having a predetermined initial surface area; and an elongated thin, bare, flexible, metal element at the potential of the metal electrode and disposed between the metal electrode and the electrical terminal in the cover, said metal element having a surface area of from 1-10 percent of the initial surface area of the metal electrode for minimizing the parasitic catalytic reduction of the soluble cathode at the surface of the metal element.

2. An electrochemical cell in accordance with claim 1 wherein:
   the reducible soluble cathode in the electrolytic solution is thionyl chloride;
   the cathode structure comprises an aggregation of porous carbon conglomerates permeable by the electrolytic solution and defining a surface area for the catalytic reduction of the thionyl chloride in the electrolytic solution; and
   the metal electrode includes an alkali metal.

3. An electrochemical cell in accordance with claim 2 wherein:
   the alkali metal of the metal electrode is lithium.

4. An electrochemical cell in accordance with claim 3 wherein:
   the metal housing is an elongated cylindrical housing;
   the carbon cathode structure is an elongated, cylindrical, tubular member; and
   the lithium electrode is an elongated, cylindrical member.

5. An electrochemical cell in accordance with claim 4 wherein:
   the lithium electrode is spaced from the cathode structure and the metal housing of the cell by a porous insulative separator material.

6. An electrochemical cell, comprising:
   a metal housing and a cover for said housing, said cover having an elongated, tubular metal terminal extending therethrough into the housing; and an electrochemical system within the metal housing and including an electrolytic solution and a battery stack exposed to the electrolytic solution, said electrolytic solution being introduced into the metal housing by way of the tubular metal terminal in the cover and including a catalytically-reducible soluble cathode, and said battery stack comprising:

a cathode structure adjacent to the metal housing and operative during discharge of the cell to catalytically reduce the soluble cathode of the electrolytic solution; and an anode structure comprising:

a metal electrode spaced from the cathode structure and the metal housing and having a predetermined initial surface area; and an elongated, thin, bare, flexible, metal element at the potential of the metal electrode and connected to the metal electrode and passing through the elongated, tubular terminal in the cover and secured to the metal terminal, the portion of said flexible metal element intermediate to the metal electrode and the metal terminal having a surface area of from 1–10 percent of the initial surface area of the metal electrode for minimizing the parasitic catalytic reduction of the soluble cathode at the surface of said portion of the flexible metal element intermediate to the metal electrode and the electrical terminal.

7. An electrochemical cell in accordance with claim 6 wherein:

the reducible soluble cathode in the electrolytic solution is thionyl chloride;

the cathode structure comprises an aggregation of porous carbon conglomerates permeable by the electrolytic solution and defining a surface area for the catalytic reduction of the thionyl chloride in the electrolytic solution; and the metal electrode includes an alkali metal.

8. An electrochemical cell in accordance with claim 7 wherein:

the alkali metal of the metal electrode is lithium.

9. An electrochemical cell in accordance with claim 8 wherein:

the metal housing is an elongated cylindrical housing;
the carbon cathode structure is an elongated, cylindrical, tubular member; and
the lithium electrode is an elongated, cylindrical member.

10. An electrochemical cell in accordance with claim 9 wherein:

the lithium electrode is spaced from the cathode structure and the metal housing of the cell by a porous insulative separator material.

11. An electrochemical cell, comprising:

a metal housing and a cover for said housing, said cover having an elongated tubular metal terminal extending therethrough into the housing; and an electrochemical system within the metal housing and including an electrolytic solution and a battery stack exposed to the electrolytic solution, said electrolytic solution being introduced into the metal housing by way of the tubular metal terminal in the cover and including a catalytically-reducible soluble cathode, and said battery stack comprising:

a cathode structure adjacent to the metal housing and operative during discharge of the cell to catalytically reduce the soluble cathode of the electrolytic solution; and an anode structure comprising:

a metal electrode spaced from the cathode structure and the metal housing;

an elongated, flexible, metal element at the potential of the metal electrode and connected to the metal electrode and passing through the elongated, tubular metal terminal in the cover and secured to the metal terminal; and a chemically-stable, anti-parasitic discharge material covering the portion of the elongated, flexible, metal element intermediate to the metal electrode and the metal terminal in the cover and operative to prevent the catalytic reduction of the soluble cathode in the electrolytic solution at the surface of said portion of the flexible metal element covered by the anti-parasitic discharge material.

12. An electrochemical cell in accordance with claim 11 wherein:

the reducible soluble cathode in the electrolytic solution is thionyl chloride;

the cathode structure comprises an aggregation of porous carbon conglomerates permeable by the electrolytic solution and defining a surface area for the catalytic reduction of the thionyl chloride in the electrolytic solution; and the metal electrode includes an alkali metal.

13. An electrochemical cell in accordance with claim 12 wherein:

the alkali metal of the metal electrode is lithium.

14. An electrochemical cell in accordance with claim 13 wherein:

the anti-parasitic discharge material is selected from the group consisting of a metal, ethylene chlorotrifluoroethylene, and a copolymer of ethylene and polytetrafluoroethylene.

15. An electrochemical cell in accordance with claim 14 wherein:

the metal of the group of anti-parasitic discharge materials is lithium.

16. An electrochemical cell in accordance with claim 15 wherein:

the metal housing is an elongated cylindrical housing;
the carbon cathode structure is an elongated, cylindrical, tubular member; and
the lithium electrode is an elongated, cylindrical member.

17. An electrochemical cell in accordance with claim 16 wherein:

the lithium electrode is spaced from the cathode structure and the metal housing of the cell by a porous insulative separator material.

18. An electrochemical cell in accordance with claim 13 wherein:

the anti-parasitic discharge material further covers the surface of the elongated tubular metal terminal in the cover and the anti-parasitic discharge material covering the tubular metal terminal and the portion of the elongated, flexible, metal element intermediate to the lithium electrode and the metal terminal is selected from the group consisting of a metal, ethylene chlorotrifluoroethylene, and a copolymer of ethylene and polytetrafluoroethylene.

19. An electrochemical cell in accordance with claim 18 wherein:

the metal of the group of anti-parasitic discharge materials is lithium.

20. An electrochemical cell in accordance with claim 19 wherein:
the metal housing is an elongated cylindrical housing;
the carbon cathode structure is an elongated, cylindrical, tubular member; and
the lithium electrode is an elongated, cylindrical member.

21. An electrochemical cell in accordance with claim 20 wherein:
the lithium electrode is spaced from the cathode structure and the metal housing of the cell by a porous insulative separator material.

22. An electrochemical cell in accordance with claim 13 further comprising:
insulating means disposed on the surface of the tubular metal terminal in the cover for preventing the catalytic reduction of the soluble cathode in the electrolytic solution at the surface of the metal terminal covered by the insulating means.

* * * * *